United States Patent
Tautz et al.

(10) Patent No.: US 10,585,116 B2
(45) Date of Patent: Mar. 10, 2020

(54) SCANNING PROBE MICROSCOPE AND METHOD FOR MEASURING LOCAL ELECTRICAL POTENTIAL FIELDS

(71) Applicant: Forschungszentrum Juelich GmbH, Juelich (DE)

(72) Inventors: Frank Stefan Tautz, Aachen (DE); Ruslan Temirov, Cologne (DE); Christian Wagner, Dueren (DE); Matthew Felix Blishen Green, Berlin (DE)

(73) Assignee: FORSCHUNGSZENTRUM JUELICH GMBH, Juelich (DE)

( * ) Notice: Subject to any disclaimer, the term of this patent is extended or adjusted under 35 U.S.C. 154(b) by 137 days.

(21) Appl. No.: 15/550,036

(22) PCT Filed: Jan. 18, 2016

(86) PCT No.: PCT/DE2016/000021
§ 371 (c)(1),
(2) Date: Aug. 10, 2017

(87) PCT Pub. No.: WO2016/127969
PCT Pub. Date: Aug. 18, 2016

(65) Prior Publication Data
US 2018/0024161 A1    Jan. 25, 2018

(30) Foreign Application Priority Data
Feb. 13, 2015   (DE) .................. 10 2015 001 713

(51) Int. Cl.
*G01Q 60/30* (2010.01)
*G01Q 60/42* (2010.01)

(52) U.S. Cl.
CPC ............. *G01Q 60/30* (2013.01); *G01Q 60/42* (2013.01)

(58) Field of Classification Search
USPC ...................................... 850/36, 33
See application file for complete search history.

(56) References Cited

U.S. PATENT DOCUMENTS

| | | |
|---|---|---|
| 7,114,378 B1 | 10/2006 | Barth et al. |
| 8,726,411 B1 | 5/2014 | Tseng et al. |
| 2003/0001091 A1 | 1/2003 | Nakayama et al. |
| 2007/0035724 A1* | 2/2007 | Banin ................ G01N 21/6428 356/236 |

(Continued)

FOREIGN PATENT DOCUMENTS

| | | |
|---|---|---|
| CN | 1397010 A | 2/2003 |
| CN | 102483428 A | 5/2012 |

(Continued)

OTHER PUBLICATIONS

Florian Pump et al: "Quantum transport through STM-lifted single PTCDA molecules", Applied Physics A; Materials & Science Processing, Springer, Berlin, DE, vol. 93, No. 2, Aug. 15, 2008 (Aug. 15, 2008), pp. 335-343, XP019626930.

(Continued)

*Primary Examiner* — Kiet T Nguyen
(74) *Attorney, Agent, or Firm* — Leydig, Voit & Mayer, Ltd.

(57) ABSTRACT

A scanning probe microscope includes a tip. A quantum dot is applied to the tip.

32 Claims, 8 Drawing Sheets

(56) References Cited

U.S. PATENT DOCUMENTS

| | | | |
|---|---|---|---|
| 2011/0309330 A1* | 12/2011 | Ohnesorge | B82Y 10/00 257/20 |
| 2012/0151638 A1 | 6/2012 | Temirov et al. | |
| 2012/0198591 A1* | 8/2012 | Ohnesorge | H01L 27/22 850/23 |
| 2014/0345007 A1 | 11/2014 | Williams et al. | |
| 2015/0067930 A1* | 3/2015 | Raschke | G01Q 210/00 850/1 |

FOREIGN PATENT DOCUMENTS

| | | |
|---|---|---|
| JP | 2010078584 A | 4/2010 |
| KR | 100696870 B1 | 3/2007 |
| TW | 201437640 A | 10/2014 |
| WO | WO 2003083437 A2 | 10/2003 |
| WO | WO 2013108060 A1 | 7/2013 |

OTHER PUBLICATIONS

Zwiller V et al: "Growth of single quantum dots on preprocessed structures: Single photon emitters on a tip", Applied Physics Letters, A I P Publishing LLC, US, vol. 86, No. 9, Feb. 25, 2005 (Feb. 25, 2005), pp. 91911-091911, XP012066519.

Deng Z T et al: "Selective analysis of molecular states by functionalized scanning tunneling microscopy tips", Physical Review Letters, American Physical Society, US, vol. 96, No. 15, Apr. 21, 2006 (Apr. 21, 2006), pp. 156102/1-156102/4, XP002513429.

Christian Wagner et al; Scanning Quantum Dot Microscopy, Physical Review Letters, vol. 115, No. 2, Jul. 1, 2015 (Jul. 1, 2015), XP055272856.

Romain Stomp, et al., "Detection of Single.Electron Charging in an Individual InAs Quantum Dot by Noncontact Atomic-Force Microscopy", Physical Review Letters, vol. 94, issue 5, Feb. 11, 2005, pp. 056802/1-056802/4.

J. Zhu, et al., "Frequency shift imaging of quantum dots with single-electron resolution", Applied Physics Letters, vol. 87, issue 24, Dec. 2005, pp. 242102/1-242102/3.

Lynda Cockins, et al., "Energy levels of few-electron quantum dots imaged and characterized by atomic force microscopy", Proceedings of the National Academy of Sciences of the United States of America, vol. 107, No. 21, May 25, 2010, pp. 9496-9501.

Yonkil Jeong, et al., "Local interaction imaging by SiGe quantum dot probe", Current Applied Physics, vol. 12, Dec. 2012), pp. 581-584.

J. Colcerho, et al., "Resolution enhancement and improved data interpretation in electrostatic force microscopy", Phys. Rev. B 64, 245403, Nov. 28, 2001.

Florian Pump, et al., "Quantum transport through STM-lifted single PTCDA molecules", Applied Physics A: Materials Science & Processing, vol. 93, May 15, 2008, pp. 335-343.

Hoshino, K., et al., "Single Monolayer Nanocrystal Led Onprobe Tip for Nearfield Molecular Image and Patterning", IEEE 21st International Conference on Micro Electro Mechanical Systems, Jan. 13, 2008, pp. 128-131.

\* cited by examiner

SCANNING PROBE MICROSCOPE AND METHOD FOR MEASURING LOCAL ELECTRICAL POTENTIAL FIELDS

CROSS REFERENCE TO RELATED APPLICATIONS

This application is a U.S. National Stage Application under 35 U.S.C. § 371 of International Application No. PCT/DE2016/000021 filed on Jan. 18, 2016, and claims benefit to German Patent Application No. DE 10 2015 001 713.6 filed on Feb. 13, 2015. The International Application was published in German on Aug. 18, 2016 as WO 2016/127969 A1 under PCT Article 21(2).

FIELD

The invention relates to a scanning probe microscope and to a method for measuring local electrical potential fields at nanometer resolution.

BACKGROUND

According to the prior art, electrical potentials or electrical fields are measured at nanometer resolution using scanning probe microscopes by means of either local contact potential difference measurement (Kelvin probe force microscopy—KPFM) or direct measurement of the forces between charges in a sample and the image charges in the metal tip caused by influence (electrostatic force microscopy—EFM). (S. Sadewasser, T. Glatzel, eds. Kelvin Probe Force Microscopy. Springer Verlag Berlin Heidelberg 2012. J. Colchero, A. Gil, and A.M Baró, 'Resolution enhancement and improved data interpretation in electrostatic force microscopy', Physical Rev. B 64 245403 (2001).)

However, the methods according to the prior art have some drawbacks. In EFM, forces acting on parts of the atomic-force microscope tip that are located further away are also measured, since electrical fields are long-range, while in KPFM the measured contact potential different is also influenced by parts of the scanning probe microscope tip that are located further away. As a result, the size of the metal tip, in particular the tip radius, which cannot measure much below 30 nm, restricts the lateral resolution that can be attained with the particular measurement. This restriction occurs in both KPFM and EFM. A drawback of EFM is that only forces are measured—not electrical fields and potential differences —and so it is difficult to determine the electrical field since it is not possible to measure any verified, independent information on the charges influenced in the tip. A disadvantage of KPFM is that the measurement resolution is dependent on the distance from the tip to the sample being investigated and on the tip radius. For this reason, KPFM can also only be used to measure two-dimensional contact potential difference maps over a sample surface; these maps are difficult to expand into the third dimension vertically with respect to the sample surface.

In addition, the force measured by the atomic-force microscope is non-specific, so in EFM, in addition to the electrical forces to be quantitatively detected, all the other active forces, such as van der Waals forces, are detected too. The overall force is then measured. Extracting or determining the electrical force thus necessitates complex analysis methods, if these are even possible. This is a particularly large drawback when the local electrical potential field around nanostructures is to be measured and when other forces, such as van der Waals forces, are significantly less laterally dependent on the lateral position but are possibly much stronger than the electrical force. In this case, the signal being sought has to be determined as a small modulation on a large signal, which creates measurement problems.

SUMMARY

In an embodiment, the present invention provides a scanning probe microscope including a tip. A quantum dot is applied to the tip.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 4$b$-4$m$ show measurement values above a molecule, compared with simulations in FIG. 4$n$-4$p$;

DETAILED DESCRIPTION

Figure 1:
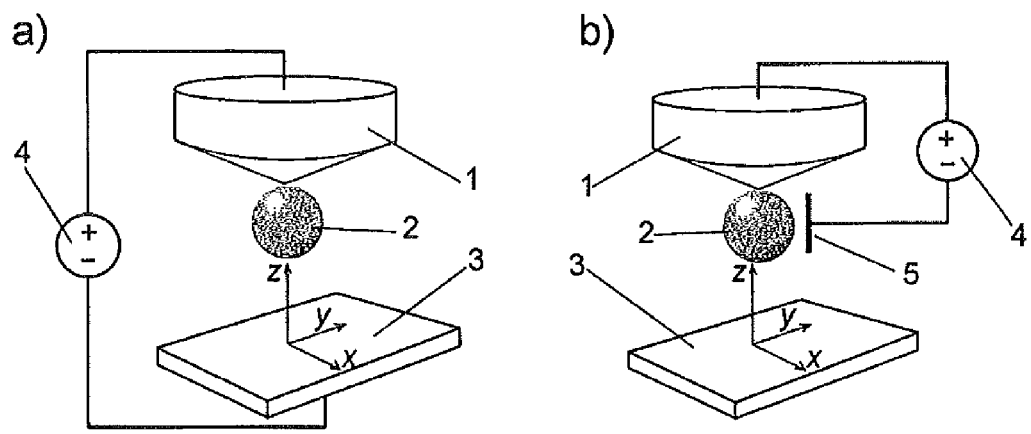
FIGS. 1$a$ and 1$b$ are schematic views of the tip of a scanning probe microscope according to the invention in two possible embodiments.

Embodiments of the invention overcome certain drawbacks of the prior art. In particular, embodiments of the invention prevent the measurement being influenced by parts of the tip that are further away from the pointed end thereof, for example round, wider regions of the tip, since in practice a tip is not ideally pointed or spherical. The spatial resolution of the measurement will also be increased. In particular, the resolution of the measurement will be independent of the tip radius and of the distance between the tip and the sample being investigated. In particular, three-dimensional cards of the potential field will also be able to be measured. In addition, unlike in EFM, electrical potential fields will be measured instead of electrical forces. The scanning probe microscope according to the invention and the method according to the invention will make it possible in particular to only measure electrical potential fields. The measurement of other force fields or potential fields, e.g. those of van der Waals interactions, will be prevented such that only electrical potential fields are detected by the scanning probe microscope measurement.

By a device according to the invention and the method according to the invention, it is possible to measure electrical potential fields and to obtain a higher spatial resolution in the measurement of electrical potential fields. Parts of the tip located further away from the tip end no longer affect the measurement, so the resolution is better than with the devices and methods according to the prior art. The resolution of a device according to the invention and of a method according to the invention can reach 0.5 nm, regardless of the distance from the sample surface. A device according to the invention and a method according to the invention in particular allow three-dimensional potential field maps to be measured. A device according to the invention and a method according to the invention in particular make it possible to only detect the electrical potential field during the measurement, eliminating foreign interference, e.g. van der Waals interactions, and preventing distortion of the measurement results.

FIG. 1a shows the tip 1 of a scanning probe microscope according to an embodiment of the invention, to which a quantum dot 2 is applied. Below the tip 1 having the quantum dot 2 is a sample surface 3. The sample surface 3 and the tip 1 are interconnected via a voltage source 4.

FIG. 1b shows a variant of a scanning probe microscope according to an embodiment of the invention, consisting of a tip 1 and a quantum dot 2 above a sample surface 3. In this variant, the voltage of the voltage source 4 is applied between the tip 1 and another electrode 5 guided towards the quantum dot 2.

Figure 2:
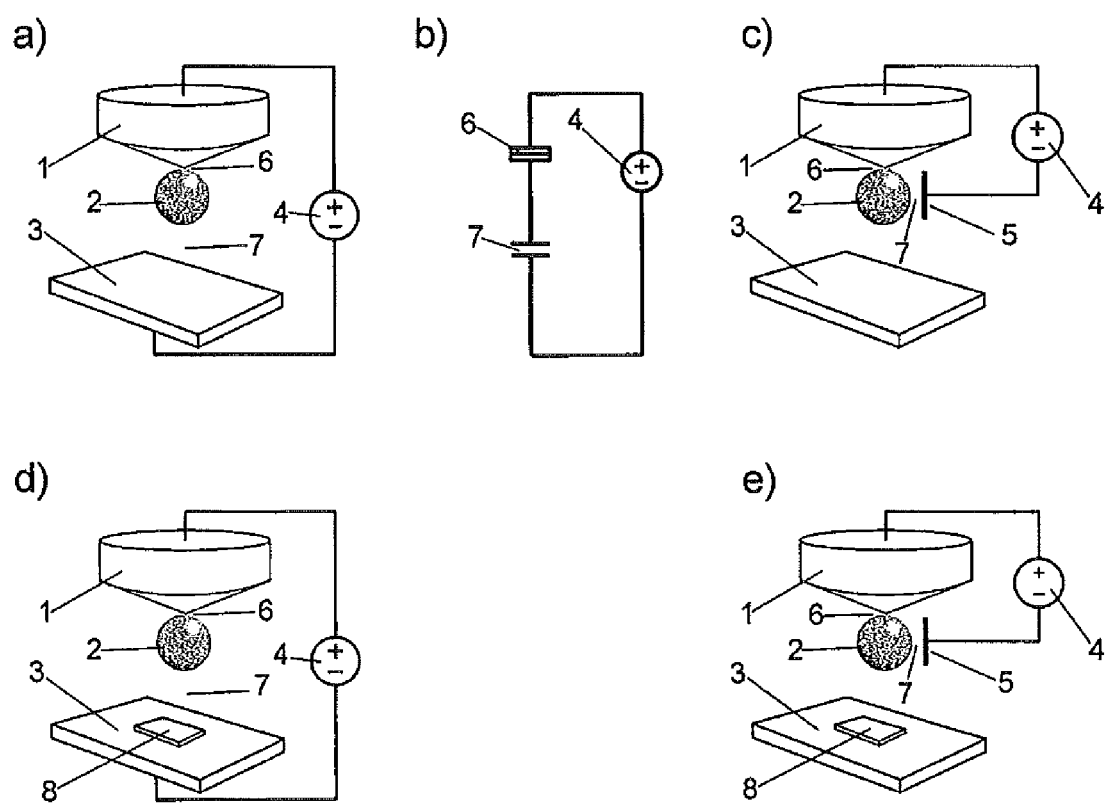
FIGS. 2$a$, 2$b$, 2$c$, 2$d$, and 2$e$ illustrate the mode of operation of a scanning probe microscope tip modified according to the invention, by likening it to an electrical circuit.

In FIGS. 2a, 2b, 2c, 2d, and 2e, like device features have the same reference numerals. Sub-figures a) and c) correspond to sub-figures a) and b) in FIG. 1. In FIG. 2b, the combination of tip 1, quantum dot 2, and sample surface 3 is shown in the form of an equivalent circuit comprising a capacitor 6, through which a tunneling current is possible, and a capacitor 7, through which a tunneling current is either possible or not possible. For the functioning of the device according to the invention and the method according to the invention, a tunneling current through the capacitor 7 is neither necessary nor damaging. In FIGS. 2a and 2c, the capacitor 6 corresponds to the combination of the tip 1 and the quantum dot 2. In FIG. 2a, the capacitor 7 corresponds to the combination of the sample surface 3 and the quantum dot 2, while the capacitor 7 in FIG. 2c corresponds to the combination of electrode 5 and the quantum dot 2. '4' denotes a voltage source. FIG. 2d corresponds to FIG. 2a, having on the sample surface 3 an additional nanostructure 8 of which the local electrical potential field is to be measured. FIG. 2e corresponds to FIG. 2c, having on the sample surface 3 an additional nanostructure 8 of which the local electrical potential field is to be measured.

Figure 3:
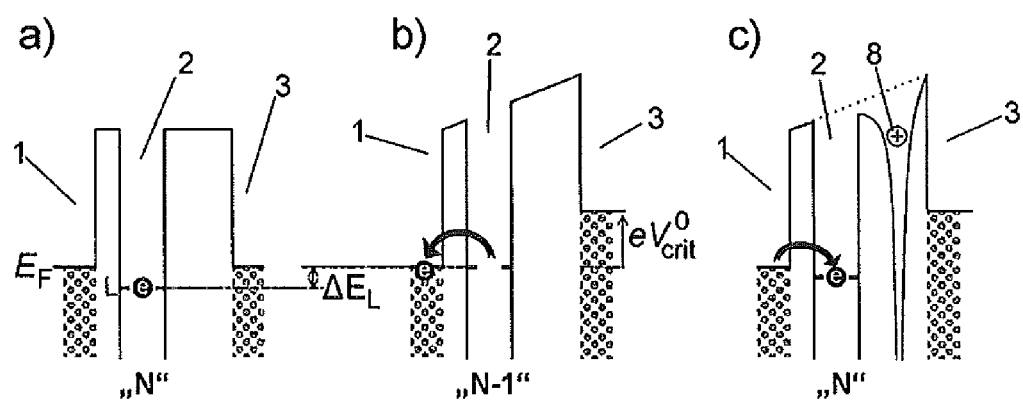
FIGS. 3$a$, 3$b$, and 3$c$ illustrate the principle of an electrical potential field measurement according to the invention.

FIGS. 3a, 3b, and 3c show an energy diagram of the tip 1, quantum dot 2, and sample surface 3. These drawings are based on a configuration of the device according to the invention as shown in FIG. 1a, though this does not imply a limitation to the principle of operation of the invention. In addition, FIG. 3c contains a nanostructure 8. In this case, the nanostructure 8 is shown in a simplified manner by a single electrical point charge. In FIG. 3a, the energy level L of the quantum dot 2 is occupied by an electron. This quantum dot state is denoted by 'N'. In FIG. 3b, an electrical voltage $V_{crit}^0$ is applied between the tip 1 and the sample surface 3, so the energy level L of the quantum dot 2 is discharged (the electron in the quantum dot 2 in FIG. 2a transfers into the tip 1). This quantum dot state is denoted by 'N−1'. In FIG. 3c, there is a nanostructure 8 (represented by a point charge) between the tip 1 and the sample surface 3. Owing to its local electrical potential field, said nanostructure modifies the potential curve between the tip 1 and the sample surface 3, in particular at the site of the quantum dot 2, so the energy level L of the quantum dot 2 is recharged and the quantum dot 2 thus reverts to the N state, even though the same electrical voltage $V_{crit}^0$ is still applied between the tip 1 and the sample surface 3.

Figure 4:
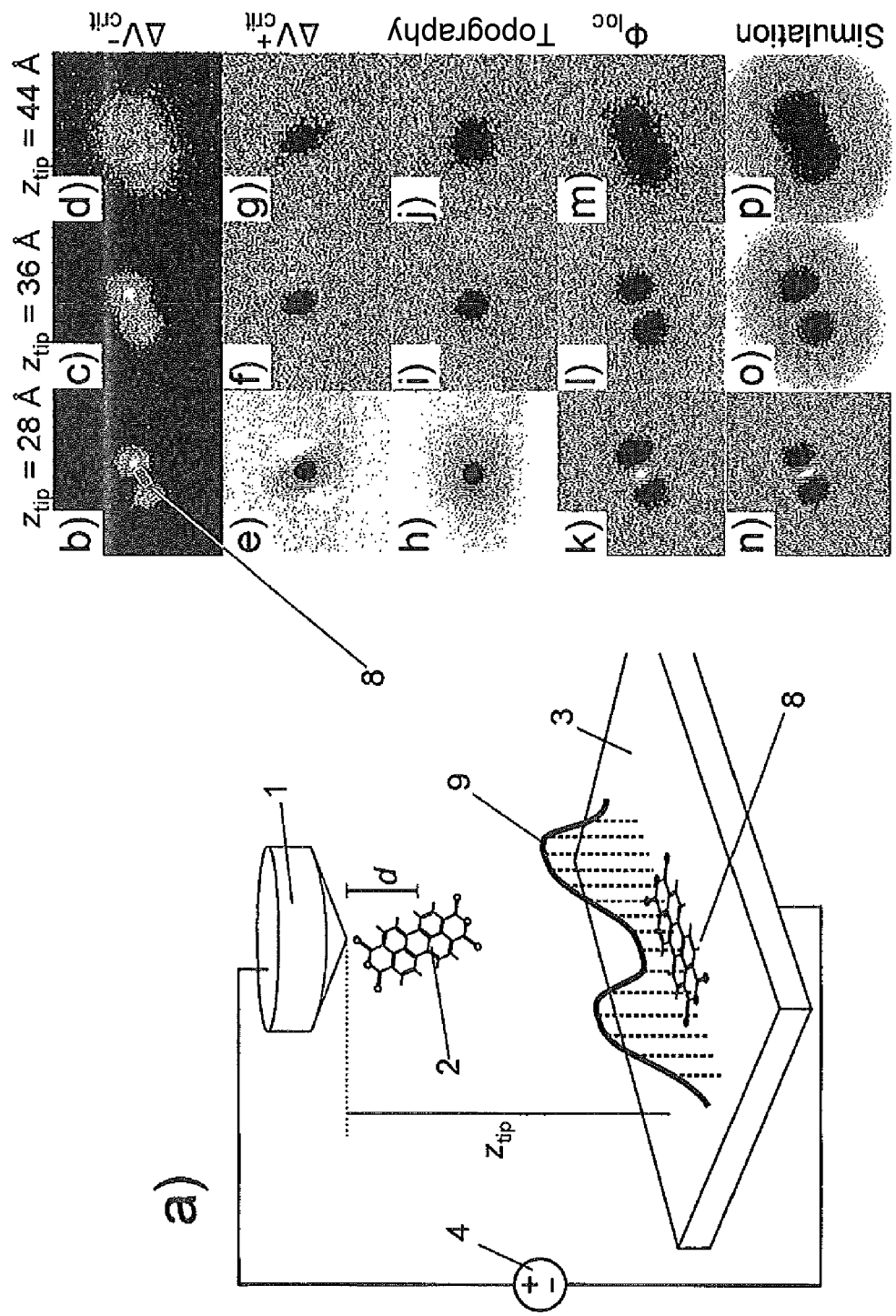
FIG. 4$a$ shows an example shape of the electrical potential field above a molecule.

FIG. 4a schematically shows the lateral shape of the electrical potential 9 over a nanostructure 8 (in this case a PTCDA molecule 8). The quantum dot 2 is implemented as a PTCDA molecule 2. FIGS. 4b to 4g show maps of the shift $\Delta V_{crit}$ in the critical voltage above the nanostructure 8 at three different heights $Z_{tip}$ of the tip 1 on the sample surface 3. In this regard, FIGS. 4b, 4c, and 4d relate to negative critical voltages $V_{crit}^{0,-}$, whereas FIGS. 4e, 4f, and 4g relate to positive critical voltages $V_{crit}^{0,+}$. FIGS. 4h to 4m show the data from FIGS. 4b to 4g separated according to the topography signal (FIGS. 4h, 4i, and 4j) and the electrical potential field (4k, 4l, and 4m). The gray scales in FIGS. 4h, 4i and 4j correspond to the values of the topography in Å. The gray scales in FIGS. 4k, 4l, and 4m correspond to the values of the electrical potential, calibrated according to the method in FIG. 9. The maps in FIGS. 4b to 4g were recorded using the method M1 in a measurement arrangement as in FIG. 1a/2d. The maps in FIGS. 4n, 4o, and 4p are simulated calculations of the local electrical potential of PTCDA.

On the x-axis, FIG. 5a shows the voltage (in mV) applied by means of the voltage source 4 in FIG. 1a, and on the y-axis it shows the frequency shift of a frequency-modulated atomic-force microscope (in Hz). The various curves 10 were recorded at different distances between the tip 1 and the sample surface 3. Peak 10a marks a charge change of the quantum dot 2 at a negative critical voltage $V_{crit}^0$ denoted by $V_{crit}^{0,-}$. Peak 10b marks a charge change of the quantum dot 2 at a positive critical voltage $V_{crit}^0$ denoted by $V_{crit}^{0,+}$. FIG. 5b shows the relationship between the distance from the tip 1 to the sample surface 3, and the difference $\delta V_{crit}^0 = V_{crit}^{0,+} - V_{crit}^{0,-}$ between the positive and negative critical voltages. FIG. 5c shows the relationship between the distance from the tip 1 to the sample surface 3 and the negative critical voltage $V_{crit}^{0,-}$. The dashed arrows depict the separation method between the topography and the electrical potential field according to section (F7).

Figure 6:
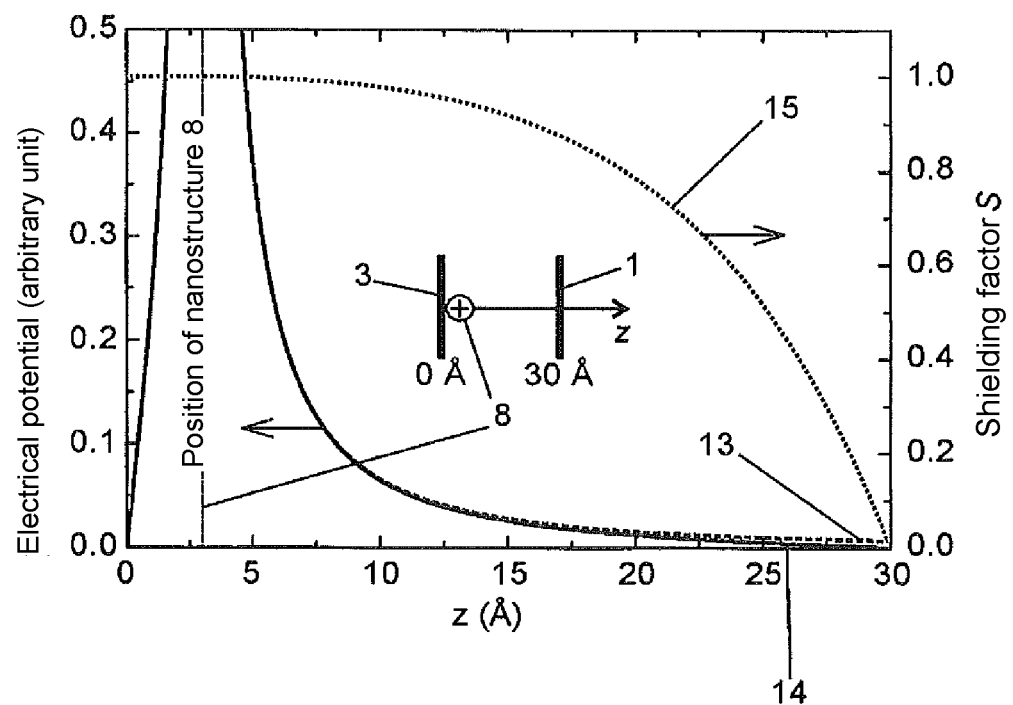
FIG. 6 shows the shape of the local electrical potential field of an electrical point charge located on a sample surface, with and without the grounded metal tip of a scanning probe microscope, and the shape of the shielding factor S of the local electrical potential field through the grounded metal tip.

FIG. 6 shows the analytically calculated shape of the electrical potential field (on the y-axis) of a nanostructure 8 (here shown by a point charge 8) at a distance of 3 Å from the sample surface 3, and more specifically along a straight line through the point charge and perpendicular to the sample surface 3. The z-coordinate on this straight line is plotted on the x-axis. The point z=0 is within the sample surface 3. Curve 13 relates to the case in which there is no tip 1 or quantum dot 2. The electrical potential the reaches the value 0 for z=∞. Curve 14 relates to the case in which the grounded metal tip 1 is at z=30 Å. The tip 1 is assumed to be a planar, infinitely extended electrode. The grounded tip 1 pulls the electrical potential to the value 0 when z=30 Å. This reduces the value of the electrical potential at all values of z on the straight line. Curve 15 shows the quotient between curves 14 and 13, and thus indicates the z-dependent shielding factor S by which the grounded tip 1 shields the local electrical potential field at z. S can take on values between 0 and 1, small shielding factors implying high shielding. Shielding factors for electrical potential fields of any charge distributions of the nanostructure 8 can be calculated by superposing the electrical potential fields of point charges.

Figure 7:
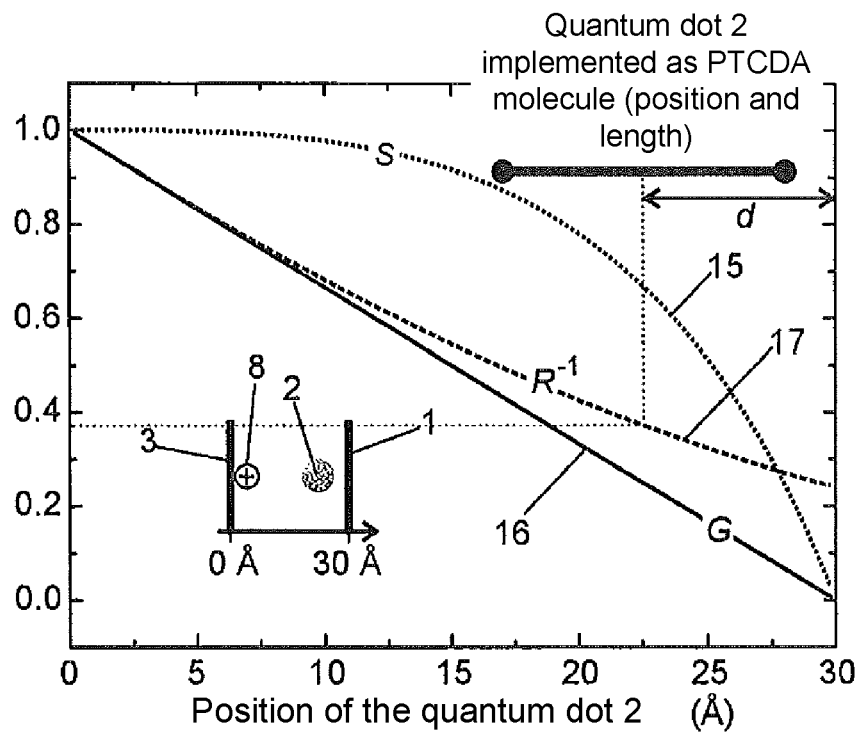
FIG. 7 shows the shape of the gating efficiency G, the shape of the shielding factor S of the local electrical potential field, and the shape of the inverse of the sensitivity factor R of the local electrical potential field measurement.

On the y-axis, FIG. 7 shows the inverse of the sensitivity factor R (curve 17) for a quantum dot 2 as a function of its position between the tip 1 and the sample surface 3, at a constant distance between the tip 1 and the sample surface 3 of 30 Å. The sensitivity factor R is defined as the ratio between the shift $\Delta V_{crit}$ in the critical voltage that is necessary in order to maintain the energy level L of the quantum dot 2 at the chemical potential of the tip 1, and the change in the local electrical potential at the site of the quantum dot 2. For a PTCDA molecule as the quantum dot 2 (shown to scale), $R^{-1} \approx 0.38$, corresponding to R≈2.5. The sensitivity factor R is produced as R=S/G, where G is the gating efficiency (curve 16) and S is the shielding factor of the local potential (curve 15, taken over from FIG. 6). The gating efficiency G is defined as a reciprocal quotient of the voltage applied between the sample surface 3 and the tip 1 and the voltage drop thereof between the quantum dot 2 and the tip 1. In the drawing, the tip 1 was assumed to be a planar, infinitely extended electrode. It was also assumed that the capacitances of the capacitors 6 and 7 in the equivalent circuit diagram FIG. 2b rise depending on the effective plate distance in the same manner. Under these assumptions, G extends linearly with the position of the quantum dot 2.

Figure 8:
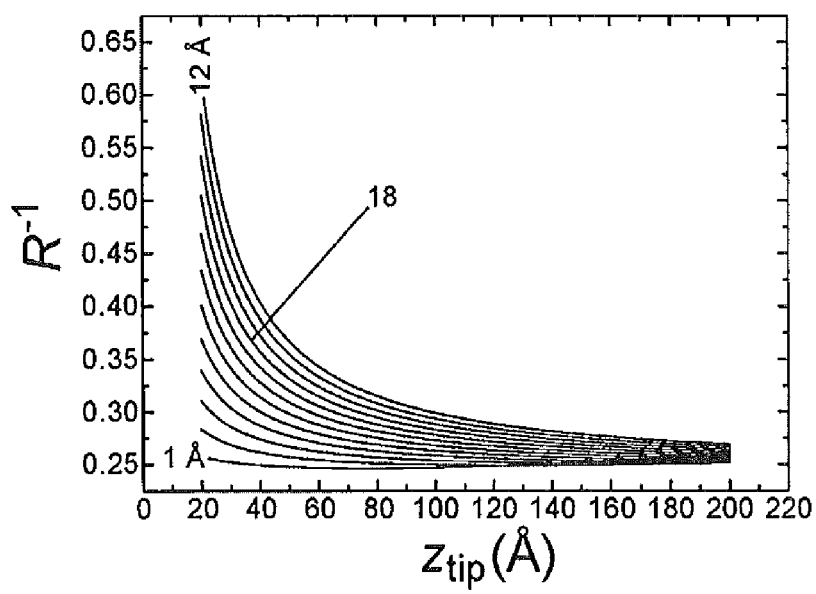
FIG. 8 shows a calibration line field for measuring the local electrical potential, for different distances between the tip and the sample.

FIG. 8 shows a calibration line field of the reciprocal sensitivity factor $R^{-1}(z_{tip},d)$ for the quantitative determination of the local electrical potential field $\Phi_{loc}(r)$. $z_{tip}$ is the distance between the tip 1 and the sample surface 3; d is the distance between the quantum dot 2 and the tip 1. Each of the curves 18 is based on a d. The uppermost curve was determined for a distance d of 12 Å, the lower curve for a distance d of 1 Å. For the curves therebetween, d rises from low to high from curve to curve, by 1 Å each time. The direct measured variable of the device according to the invention and method according to the invention is always a $\Delta V_{crit}(r)$, one for each charge change of the quantum dot 2. Owing to the relationship $\Phi_{loc}(r)=R^{-1}(z_{tip},d) \Delta V_{crit}(r)$, the local potential $\Phi_{loc}(r)$ can be quantitatively determined when a calibration line field is known. The calibration line field was determined from shielding factors S (as calculated in FIG. 6) and gating efficiencies G (as calculated in FIG. 7) according to $R(z_{tip},d)=S(z)/G(z_{tip},d)$, where $d=z_{tip}-z$.

Figure 9:
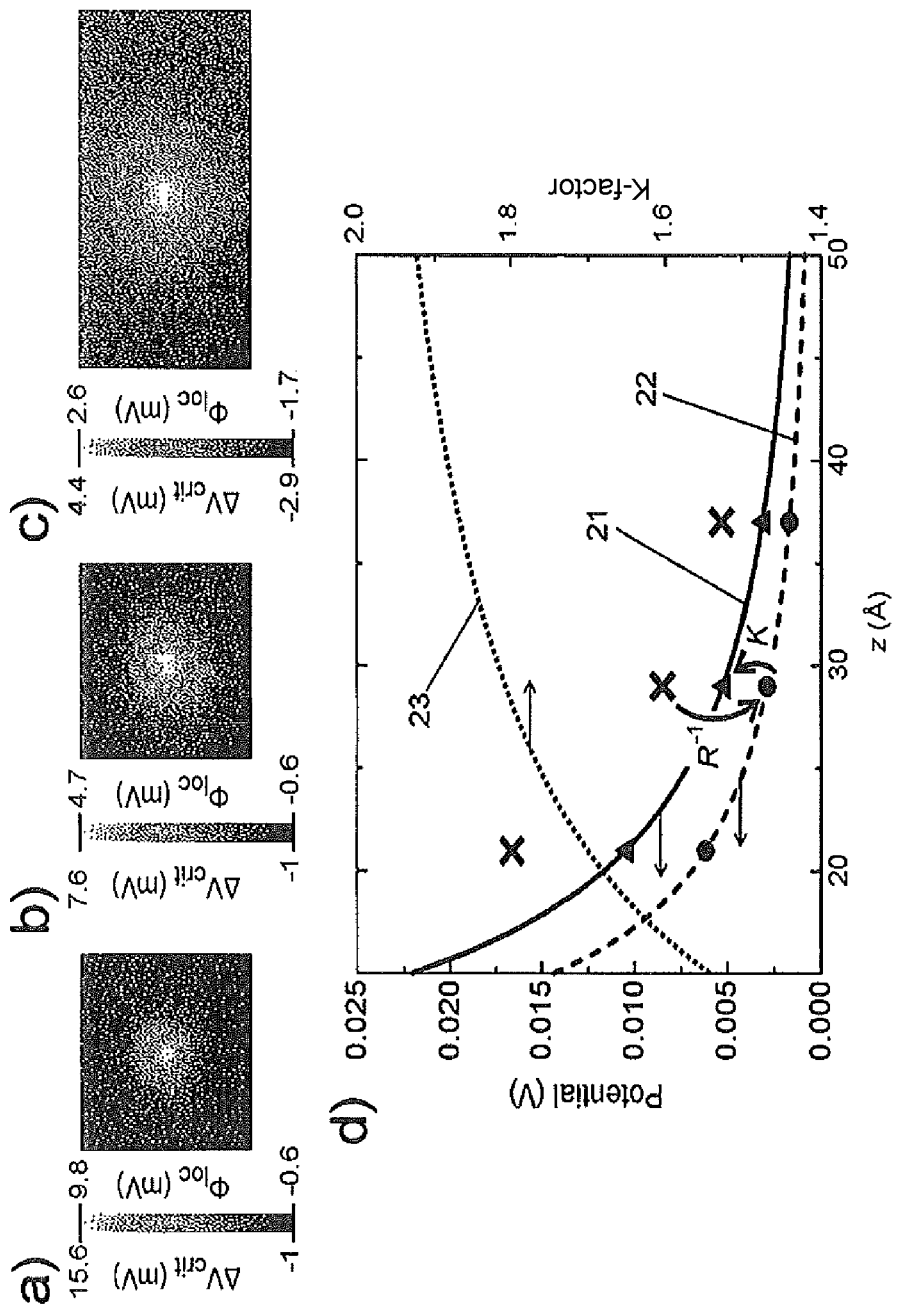
FIGS. 9$a$-9$c$ show an image for calibrating the measurement of the electrical potential field by means of a theoretical calculation.

FIG. 9 shows an image for calibrating the measurement of the local electrical potential field by means of a theoretical calculation. FIGS. 9a to 9c show measured maps of the shift in the critical voltage $\Delta V_{crit}^{gauge}$, measured at three different distances z to the sample surface 3 for an Ag adatom (=nanostructure 8) on the Ag(111) surface (=sample surface 3) to be used for calibration (FIG. 9a: z=21 Å, FIG. 9b: z=29 Å, FIG. 9c: z=37 Å). $z=z_{tip-d}$. The gray scales of $\Delta V_{crit}^{gauge}$ mV are shown on the left next to the respective scale bars. FIG. 9d contains crosses showing the values of $\Delta V_{crit}^{gauge}$ at z, taken from the maps in FIGS. 9a to 9c vertically above the adatom. FIG. 9d also contains, as curve 21, the local electrical potential $\Phi_{loc}^{gauge}$ at the given z vertically above the adatom, calculated by means of density functional theory. By applying the sensitivity factor R calculated according to the model of a planar, infinitely extended tip 1, a local electrical potential ($\Phi_{loc}(r)$) can be determined from the shift in the critical voltage $\Delta V_{crit}^{gauge}(r)$ according to $\Phi_{loc}(r)=R^{-1}(z,d)\Delta V_{crit}^{gauge}(r)$. The values $\Phi_{loc}$ thus determined vertically above the adatom are shown as circles in FIG. 9d. As curve 22, a fit is shown by means of the equation $(z-z_0)^{-2}$—the expected behavior of the electrical potential of the dipole field of the adatom that forms a Smoluchowski dipole on the metal surface. The difference between curve 21 and the circles is attributed to factors not included in the sensitivity factor R that was calculated according to the model of a planar, infinitely extended tip 1. One of these factors is the excessive field increase close to the tip 1, which is curved in reality. Another is the different increase in the capacitances of the capacitors 6 and 7 in the equivalent circuit diagram FIG. 2b as a function of their plate distance. The two factors can be summarized in a calibration factor K(z). This factor K(z) is shown as curve 23 in FIG. 9d. By means of K(z), an absolute mV scale of the electrical potential can be indicated for the maps in FIGS. 9a to 9c, based on the reference point: $(\Phi_{loc}^{gauge}(r)=R^{-1}(z,d)K(z)\Delta V_{crit}^{gauge}(r)$, where R(z,d) is the sensitivity factor calculated according to the model of a planar, infinitely extended tip 1. This scale is indicated on the right next to the scale bars in FIGS. 9a to 9c. K(z) is only dependent on the geometry of the system consisting of the tip 1 and quantum dot 2, and on first approximation is not dependent on the nanostructure 8; it can thus be transferred to any nanostructure 8 (provided it is measured using the same tip) in order to calculate a calibrated local electrical potential according to $(\Phi_{loc}(r)=R^{-1}(z,d)K(z)\Delta V_{crit}(r)$, where R(z,d) is the sensitivity factor calculated according to the model of a planar, infinitely extended tip 1. In this way, the absolute scale of the electrical potential field in FIGS. 4k, 4l, and 4m was determined for the PTCDA molecule as the nanostructure 8.

Figure 10:
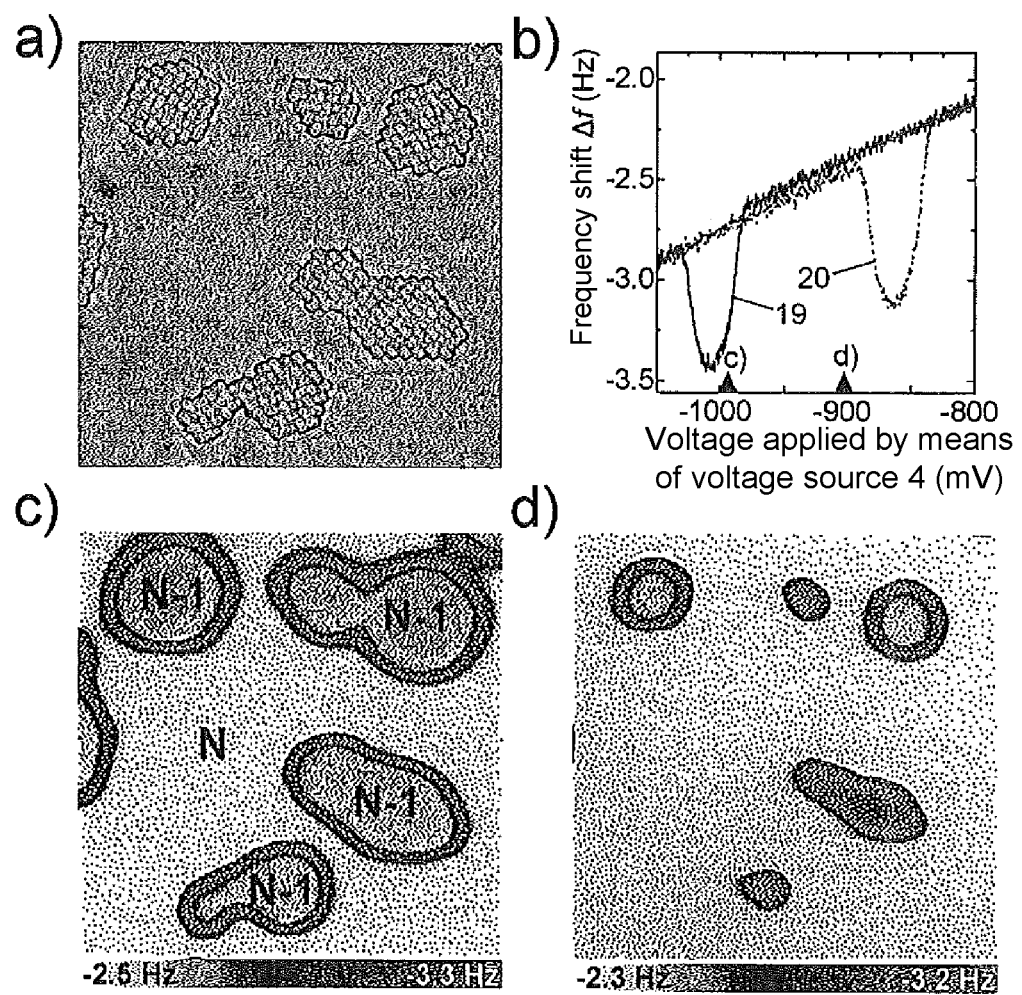
FIGS. 10$a$-10$d$ show measured equipotential lines of the electrical potential field over a sample.

FIG. 10a shows a scanning tunneling microscope image of a number of PTCDA islands on an Ag(111) surface. Between the islands, the uncovered Ag(111) surface is visible. FIGS. 10c and 10d show the same sample and the same image portion as FIG. 10a. FIGS. 10c and 10d were recorded using a dynamic atomic-force microscope having a commercially available QPlus sensor, on the tip of which there is a PTCDA molecule as quantum dot 2. The gray scale in FIGS. 10c and 10d shows the frequency shift of the QPlus sensor. The imaging method for FIGS. 10c and 10d is the method described in (M2). FIG. 10b shows two measurement curves for the frequency shift as a function of the voltage applied by means of the voltage source 4. Curve 19 was recorded over the uncovered Ag(111) surface, curve 20 in the center above a PTCDA island. The PTCDA islands can be interpreted as nanostructures 8, while the uncovered Ag(111) surface corresponds to the sample surface 3. By definition, the charge of the quantum dot 2 changes above the uncovered Ag(111) surface, i.e. at $V_{crit}^{0,-}$. $V_{crit}^{0,-}$ corresponds to the position of the minimum of curve 19 on the x-axis in FIG. 10b. By selecting the voltage applied by means of the voltage source 4 (FIG. 1a), the potential of the equipotential lines to be imaged can be set. In FIG. 10c, −1000 mV was selected as the applied voltage. The potential of the equipotential lines in FIG. 10c is therefore $\Phi_{loc}=R^{-1}(V_{crit}^{0,-}+1000$ mV). In FIG. 10d, −900 mV was selected as the applied voltage. The potential of the equipotential lines in FIG. 10d is $\Phi_{loc}=R^{-1}(V_{crit}^{0,-}+900$ mV).

According to an embodiment of the invention, a scanning probe microscope is provided, to the tip of which a quantum dot is applied. Embodiments of the invention include a scanning probe microscope on the tip of which a quantum dot is positioned or to the tip of which a quantum dot is applied and a method for measuring electrical potential fields using such a scanning probe microscope. In a particular embodiment of the invention, the scanning probe microscope can also be an atomic-force microscope that constitutes a special embodiment of a scanning probe microscope.

The term 'quantum dot' is known to a person skilled in the art. It can be taken as a functional term, and is a spatially restricted structure in which electrons assume discrete energy values. The quantum dot can be implemented by any means that produce this property. These means can be a substance or a device. In the case of a substance, the following substances or substance classes are stated as an example, but these are not limiting. Organic, metal-organic or inorganic materials are possible. As substances, all molecules or spatially restricted arrangements of material that satisfy the criterion of implementing the property of a quantum dot are possible. What is important is to position the electrons in a limited spatial region. The spatially restricted arrangements of material can be ordered at an atomic or molecular level, or not ordered. The spatially restricted arrangements of material can be nanocrystals, ordered or non-ordered clusters, nanotubes, e.g. carbon nanotubes (CNT), or lithographic structures. The nanocrystals can, for example, be metal clusters, in particular (but not necessarily) having shells made of organic ligands, doped or undoped semiconductor nanostructures, in particular nanowires, and nanocrystals or clusters of molecules. The molecules can be organic, bioorganic, inorganic, or metal-organic molecules, for example metal complexes, metallocenes, aromatic molecules, condensed aromatic molecules or aliphatic molecules and their derivatives, with or without heteroatoms such as O, N, S, or P, for example 3,4,9,10-perylenetetracarboxylic dianhydride (PTCDA) as shown in FIG. 4a.

Possible embodiments of a quantum dot are devices that enable an electron gas to be restricted to a limited spatial region in a suitable material. These devices can contain suitable micro-scale or nano-scale electrodes that produce the spatial restriction of an electron gas in a suitable material by means of their electric fields. Suitable materials in which spatial restrictions of an electron gas can be produced by such electrodes are, for example, doped semiconductors, graphene, silicon, or other two-dimensional materials or substances. Other suitable devices can be materials structured suitable in lithographic terms. Suitable lithographic structures can also be structured directly into the tip of the scanning probe microscope.

In particularly advantageous embodiments, the contact between the conductive tip of the scanning probe microscope and the quantum dot is mechanically and chemically stable, such that the quantum dot on the tip remains stationary during the scanning process. In particularly advantageous embodiments, the contact is also created such that it constitutes tunneling barriers, such that the electronic coupling of the quantum dot to the electron reservoir in the metal tip is low. In FIG. 2b, the tunneling barrier corresponds in functional terms to the capacitor 6. This means that the quantum dot on the tip retains its properties as a quantum dot particularly well. Specifically, this can be achieved by a suitable chemical bond to the tip or by a thin electrically insulating layer between the quantum dot and the metal tip. A chemical bond should be understood to be a chemical bond between the tip and the quantum dot. The insulating layer can be implemented by different embodiments, for example salts, oxides or other insulators. If there is a molecule or a nanocrystal as the quantum dot, part thereof can also take over the function of the insulating layer. This can be a heteroatom, such as O, S, N, or P, or a structural sub-unit of the quantum dot. In the case of a PTCDA molecule as a quantum dot (FIG. 4a), the insulator is produced by the oxygen atom and its chemical bond to the tip.

In particularly advantageous embodiments, the spatial extension of the quantum dot is so small that the spatial region via which the electrical potential is averaged is as small as possible, but at the same time sufficiently large to prevent the discrete energy levels of the quantum dot on the energy axis from being too far away from one another, so that at least one of these levels can be shifted to the chemical potential of the tip using moderate voltages (smaller than approximately 10 V). The spatial region via which the electrical potential is averaged corresponds to the size of the quantum dot. In particularly advantageous embodiments, this is achieved by compact, preferably aromatic, molecules, as a result of which the extension of the spatial regions used for the averaging can reach as low as 0.5 nm.

The quantum dot can be fixed to the metal tip by chemical or physical (e.g. dispersion forces) bonding. The quantum dot can either be held together with the tip of the scanning probe microscope by a support, or be produced directly on the tip. For this purpose, available methods include established manipulation methods by means of scanning probe methods, and established methods of epitaxial growth, lithographic structuring methods or catalytic growth of (semi-conductor) nanostructures. Particularly advantageous embodiments of this fixing combine mechanical and chemical stability and electrically insulating properties, and are spatially restricted to the size of one atom or less.

When carrying out a method according to the invention, the scanning probe microscope tip to which the quantum dot is applied is guided over a sample to be investigated. In this process, the electrical potential field is measured by measurements being taken one after the other at different points. The measurement of the electrical potential at a given point will be described in more detail in the following section (P1 to P6) on the basis of the physical active principles.

(P1) By means of a voltage applied by means of the voltage source 4, the energy levels of the quantum dot 2 can be shifted relative to the chemical potential of the tip 1—what is known as gating. As a result, the occupation of the quantum dot 2 by electrons can be controlled. FIG. 1 shows two possibilities for applying the voltage by means of the voltage source 4—either between the tip 1 and the sample surface 3 (FIG. 1a) or between the tip 1 and an electrode 5 moved towards the quantum dot. Though not limiting, a multi-tip scanning probe microscope according to the prior art is one possible embodiment of the measurement arrangement in FIG. 1b. In this case, one of the tips of the multi-tip scanning probe microscope is used as a tip 1 and another is used as an electrode 5.

(P2) In particular, the voltage applied by means of the voltage source 4 can be selected such that one of the energy levels of the quantum dot 2 (energy level L) is shifted to the chemical potential of the tip 1 (FIG. 3b). Next, the charge of the quantum dot 2 changes (either acceptance or discharge of an electron; FIG. 3b shows the discharge of an electron, though this is not limiting). If the quantum dot 2 is at a point in the space at which there is no electrical potential to be measured, the voltage applied by means of the voltage source 4 that is necessary for changing the charge of the quantum dot 2 (either by acceptance or discharge of an electron) is $V_{crit}^{0}$. $V_{crit}^{0}$ can be positive or negative. A positive $V_{crit}^{0,+}$ is denoted as $V_{crit}^{0,+}$ and a negative $V_{crit}^{0}$ is denoted as $V_{crit}^{0,-}$.

(P3) If the tip 1 together with the quantum dot 2 is moved to a point at which there is a local electrical potential to be measured, generated for example by a particular charge distribution in a nanostructure 8 located on or in the sample surface 3, the existing external electrical potential to be measured at the site of the quantum dot 2 owing to the voltage applied by means of the voltage source 4 is superposed on the local electrical potential to be measured coming from the nanostructure 8 (FIG. 3c). As a result, the critical voltage, applied by means of the voltage source 4, at which the energy level L of the quantum dot 2 is charged or discharged is changed. The new value $V_{crit}$ is different from $V_{crit}^{0}$ by $\Delta V_{crit}$, i.e. $V_{crit} = V_{crit}^{0} + \Delta V_{crit}$. The quantum dot 2 thus fulfils the function of a selective sensor for the local electrical potential to be measured. The local electrical potential can be calculated quantitatively from the voltage change $\Delta V_{crit}$; see point (P6) in this section of the description.

(P4) The possibility of precisely determining at which voltage $V_{crit}$ or $V_{crit}^{0}$ applied by means of the voltage source 4 the quantum dot 2 undergoes a charge change (either acceptance or discharge of an electron) is key for the measurement of the local electrical potential using the quantum dot 2. This can, for example, be done by force measurement, though this is not limiting. In this case, the tip 1 must be the tip of an atomic-force microscope. Other detection methods are possible.

(P5) If the externally applied electrical field at which the quantum dot 2 undergoes a charge change (either acceptance or discharge of an electron) is determined using force measurement, this can be carried out according to the following method. Owing to the charge change of the quantum dot, the charge distribution close to the atomic-force microscope tip changes. This causes a sudden change in the force acting on the tip. This sudden change can be measured by the force measurement system of the atomic-force microscope (FIG. 5a). As a result, the local electrical potential field signal to be measured is selectively converted into a measurable force. The quantum dot 2 thus fulfils the function of a signal converter since it converts the local electrical potential into a force signal that is substantially characterized by the properties of the quantum dot 2, and less by the local electrical potential itself.

(P6) The change $\Delta V_{crit}$ in the voltage $V_{crit}$ applied by means of the voltage source 4, at which the quantum dot 2 undergoes a charge change (either acceptance or discharge of an electron) allows the local electrical potential $\Phi_{loc}$ to be quantitatively determined. The method for quantifying the local electrical potential is described below:

There is a local electrical potential field $\Phi loc(r)$ to be measured, generated by a nanostructure 8. To do so, the tip 1 having the quantum dot 2 is positioned such that the quantum dot 2 is moved in sequence to the sites r. At each r, a Vcrit(r) is determined in accordance with paragraph P3. The voltage change $\Delta Vcrit(r)$ corresponds to a change $\Delta\Phi ext(r)$ in the external electrical potential at the site r. Since the charge change of the quantum dot 2, during which its overall electron count changes from N to M (where |N−M|=1), takes place for a given N and M for all sites r at the same total electrical potential $\Phi loc(r) + \Delta\Phi ext(r)$, $\Delta V crit(r)$ in principle enables the determination of the local electrical potential $\Phi loc(r)$ at any site r, based on the local electrical potential $\Phi loc(r0)$ at the site r0 of the reference measurement, at which the critical voltage has the value Vcrit0.

For the actual determination of $\Phi loc(r)$, the geometry of the measurement arrangement consisting of the tip 1, quantum dot 2, and sample surface 3 is relevant, for three reasons:

Firstly, the presence of the metal, grounded tip 1 close to the point r at which the electrical potential $\Phi loc(r)$ to be measured is located changes the actual electrical potential at this site to a new value of $\Phi^* loc(r)$. The reason being that without the tip 1, the electrical potential $\Phi loc(r)$ disappears into infinity by the normal definition. With the tip 1, the disappearance of the electrical potential is located at the site of the tip 1. This distorts the equipotential lines of the local electrical potential field $\Phi loc(r)$ because said lines have to extend in parallel with the surface of the tip 1 in direct proximity to the metal tip 1.

However, this change in the local electrical potential from $\Phi loc(r)$ to $\Phi^* loc(r)$ is not a problem because, when the tip geometry is known, this change can be used to calculate the local electrical potential. The change is given by the site-dependent shielding factor S(r): $\Phi^* loc(r) = S(r)\Phi loc(r)$. FIG. 6 shows an example calculation of the shielding factor S(r) for a point charge. In this case, a planar, infinitely extended tip 1 is assumed. For a tip of this kind, the dependence of the shielding factor S on the lateral coordinates x and y for a z that is not too small is weak, i.e. $S(r) \approx S(z)$. This is the case in particular when the equipotential lines of the local potential field at the site of the measurement are only slightly curved and extend almost in parallel with the surface of the tip 1. For other tip geometries and charge distributions in the nanostructure 8, shielding factors S(r) can be calculated using standard electrostatics methods (boundary value problems). In the process, the charge distribution in each nanostructure 8 can be shown as a total by means of point charges. Since, by definition, the local electrical potential originating from a nanostructure 8 changes significantly to length scales which are small towards the radius of curvature of the tip 1, it can be assumed that taking the tip to be a planar, infinitely extended tip 1 is a very close approximation.

Secondly, the portion $\Delta\Phi ext(r)$ of the voltage change $\Delta Vcrit(r)$ active between the quantum dot 2 and the tip 1 is dependent on the geometry of the measurement arrangement, consisting of the tip 1, quantum dot 2, and sample surface 3. For the measurement arrangement in FIG. 1, the portion is given by the gating efficiency G: $\Delta\Phi ext(r) = G(r)\Delta Vcrit(r)$. This can be concluded directly from FIG. 3, for which $\Delta EL = GeVcrit$ and $\Delta EL = e\Phi ext$, where e is the elementary charge.

The gating efficiency G is a function of the geometry of the measurement arrangement, consisting of the tip 1, quantum dot 2, and sample surface 3 or electrode 5, and the capacitances of the capacitors in the equivalent circuit diagram FIG. 2b. In each case, the gating efficiency G is independent of the lateral position of the tip 1 over the sample surface 3 containing the nanostructure 8, if the nanostructure 8 is located in the sample surface 3, i.e. does not have a topography deviating from the sample surface 3, since the sample surface 3 is planar and infinitely extended laterally. For the measurement arrangement in FIG. 1b, the gating efficiency G is also independent of the distance between the tip 1 and the sample surface 3 and of any topographic properties of the nanostructure 8. For the measurement arrangement in FIG. 1a, the gating efficiency G is dependent on ztip (defined as the distance between the tip 1 and the sample surface 3) and d (defined as the distance between the quantum dot 2 and the tip 1), and also dependent on the topography of the nanostructure 8. FIG. 7 shows an example calculation of the gating efficiency G(ztip,d) in the measurement arrangement in FIG. 1a, for a fixed value of ztip. In this case, the tip 1 was assumed to be planar and infinitely extended. Due to the relationship d=ztip−z, the gating efficiency G can also be written as a function of z and d.

The sensitivity factor $R(r,z_{tip},d)=S(r)/G(z_{tip},d)$ can be calculated from the gating efficiency $G(z_{tip},d)$ and the shielding factor $S(r)$ of the local electrical potential at the site $r=(x,y,z)$. A sensitivity factor of the value R indicates that a voltage $\Delta(\Delta V_{crit})=R\Delta\Phi_{loc}$ applied by means of the voltage source 4 is required to balance a change in the local electrical potential $\Delta\Phi_{loc}$ in the absence of the tip 1 and quantum dot 2. Due to the relationship $d=z_{tip}-z$ the sensitivity factor R can also be written as a function of r and d: $R(r,d)=S(r)/G(z,d)$. If $S(r)\approx S(z)$, then $R(z,d)=S(z)/G(z,d)$. The reciprocal value of $R(z,d)=S(z)/G(z,d)$ is shown as curve 17 in FIG. 7.

By means of the sensitivity factor R, the local electrical potential $\Phi_{loc}(r)$, based on the value $\Phi_{loc}(r0)$ at r0 where $V_{crit}^0$ was determined, can be determined from $\Delta V_{crit}(r)$ as follows: $\Phi_{loc}(r)=R^{-1}(r,d)\Delta V_{crit}(r)$. If $S(r)\approx R(z)$, then $\Phi_{loc}(r)=R^{-1}(z,d)\Delta V_{crit}(r)$, or, written differently, $\Phi_{loc}(r)=R^{-1}(z_{tip},d)\Delta V_{crit}(r)$. The sensitivity factor R can be taken from a calibration line field. FIG. 8 shows a calibration line field of this type. Said figure shows $R^{-1}(z_{tip},d)$ on the y-axis as a function of $z_{tip}$ on the x-axis. Each of the calibration curves 18 shown relates to a different distance d between the tip 1 and quantum dot 2. The calibration line field in FIG. 8 was calculated for a planar, infinitely extended tip 1. For other tip geometries and charge distributions of the nanostructure 8, calibration line fields $R^{-1}$ can be calculated using standard electrostatics methods (boundary value problems).

Thirdly, it should be noted that, when the correct sensitivity factor $R(r,d)$ is known, the local electrical potential field, based on the value $\Phi_{loc}(r0)$ at r0, can in principle always be determined by $\Phi_{loc}(r)=R^{-1}(r,d)\Delta V_{crit}(r)$. However, it should be borne in mind that the determination of the gating efficiency G by means of the model of a planar, infinitely extended tip 1 (as is the case in FIG. 7) is only permissible in exceptional cases. The reason is as follows: since the potential field $\Delta\Phi_{ext}(r)$, which is based on the voltage $\Delta V_{crit}$ applied by means of the voltage source 4, has macroscopic dimensions owing to the macroscopic extension of the sample surface 3, the finite radius of curvature of the tip 1 should not be negligible at this length scale. As a result, close to the tip and thus also to the position of the quantum dot 2 at which the electrical potential is measured, there is an excessive field increase, which increases the actual gating efficiency G beyond the value of G determined according to the model of the planar, infinitely extended tip 1. Accordingly, the sensitivity factor $R(r,d)=S(r)/G(z,d)$ is reduced.

When the geometry of the tip is known more precisely, the excessive field increase owing to a curved, spherical or otherwise different shape tip can be determined using standard electrostatics methods (boundary value problems). Alternatively, a given tip of unknown geometry can be calibrated by first determining $\Delta V_{crit}^{gauge}(r)$ over a nanostructure of which the local potential field $\Phi_{gauge}(r)$ is known, for example from a theoretical calculation. As a result, a calibration factor K can be determined by $K(r)=\Phi_{gauge}(r)/R^{-1}(r,d)\Delta V_{crit}^{gauge}(r)$, where $R^{-1}(r,d)$ is the sensitivity factor determined according to the model of a planar, infinitely extended tip 1. This calibration factor K can then be used to determine the local electrical potential field of any nanostructure 8 according to $\Phi_{loc}(r)=R^{-1}(r,d)K(r)\Delta V_{crit}(r)$. FIG. 9 shows an example calibration of this type.

(F1) The energy levels of the quantum dot 2 can be shifted without current, and thus also for large distances between the tip 1 and the sample surface 3 in which no tunneling current is flowing anymore between the sample surface 3 and the quantum dot 2 (capacitor 7 in FIG. 2b). As a result, the electrical potential field can also be determined far away from the sample surface or over an electrically insulating sample. Furthermore, the device according to the invention and the method according to the invention do not require a normal signal from the sample surface 3, meaning the electrical potential field can be measured in open space in a completely contactless manner. The only purpose of the sample surface 3 is to act as a support for the nanostructure 8 and, in the measurement arrangement in FIG. 2d, to also act as a counter-electrode. In the measurement arrangement in FIG. 2e, the sample surface is not required as a counter-electrode and is merely used as a support for the nanostructure 8. If no support for the nanostructure is required in the measurement arrangement in FIG. 2e, the sample surface 3 is completely superfluous. Therefore, in both the measurement arrangement in FIG. 1a/2d and the measurement arrangement in FIG. 1b/2e, it is possible, in the entire half-space above the sample surface 3, to form a layered image of the electrical potential field generated there by the charge distribution, e.g. in a nanostructure 8 located on or in the sample surface 3, and thus to generate a three-dimensional map of the electrical potential field. By using the measurement arrangement shown in FIG. 1b/2e, the method according to the invention for measuring electrical potential fields can also be used for non-conductive samples.

(F2) The energy levels of the quantum dot 2 can be sufficiently sharp on the energy axis. This is achieved by weak electronic coupling of the quantum dot 2 to the electron reservoir of the metal tip 1. Specifically, this can also be achieved by a thin insulating layer or by a suitable bond between the quantum dot 2 and the metal tip 1.

(F3) By means of sufficiently sharp energy levels of the quantum dot 2, it may be possible to measure very small changes (approximately 1 mV) in the voltage, applied by means of the voltage source 4, at which the quantum dot 2 undergoes a charge change (acceptance or discharge of an electron), as well as very small local electrical potential fields.

(F4) The quantum dot 2 acts as a local probe for the electrical potential field. Only the averaged electrical potential field in the region of the quantum dot 2 influences the measurement.

(F5) The quantum dot 2 acts as a filter. Only the types of potential fields that cause a charge change in the quantum dot 2 are measured. The measurement signal is not influenced by any other forces or potential fields, in particular electrical forces and potential fields acting solely on parts of the tip 1 located further away.

(F6) The quantum dot 2 acts as an amplifier. Provided a local electrical potential field leads to a charge change of the quantum dot 2 (acceptance or discharge of an electron), this can be recorded and the local electrical potential field thus measured, specifically regardless of the strength of the local electrical potential field caused by the charge change of the quantum dot 2. In the specific case where the charge change of the quantum dot 2 is recorded by means of a force measurement, the quantum dot 2 acts as a force amplifier: depending on the design of the quantum dot 2, the force change measured using an atomic-force microscope following the charge change of the quantum dot 2 can be much greater than the force that (if measured directly) would correspond to the local electrical potential field at the measurement site.

(F7) When scanning the sample surface 3, the combination of the quantum dot 2 and the tip 1 makes it possible to distinguish between purely topographic signals that can be traced back, for example, to the topography of a nanostructure 8, and signals that can be traced back to electrical potential fields, e.g. caused by a nanostructure 8. FIGS. 4h to 4m show an example of this distinction. Topographic signals and signals based on electrical potential fields can be distinguished using the following methods:

An essential prerequisite for this method is that it must be possible to observe charge changes for a quantum dot 2 at least two different voltages applied by means of the voltage source 4, the critical voltages $V_{crit}^{0,i}$ (where i denotes different charge changes) of which changes are dependent on the distance between the tip 1 and the sample surface 3 to different extents, i.e. the differences $\delta V_{crit}^{0,ij}=V_{crit}^{0,i}-V_{crit}^{0,j}$ change according to the distance between the tip 1 and the sample surface 3. One example, which should not be taken as limiting, is changing the distance on the voltage axis between the peaks 10a and 10b in FIG. 5 as a function of $z_{tip}$, which indicates the difference between the tip 1 and the sample surface 3.

In contrast, for a given distance between the tip 1 and sample surface 3, the (hypothetical) change in the local electrical potential field to be measured at a fixed site leads to a parallel shift by the same absolute value $\Delta V_{crit}$ for all critical voltages $V_{crit}^{0,i}$, and so the differences $\delta V_{crit}^{ij}=V_{crit}^{i}-V_{crit}^{j}$ are independent of the value of the electrical potential to be measured, and thus $\delta V_{crit}^{ij}=\delta V_{crit}^{0,ij}=V_{crit}^{0,i}-V_{crit}^{0,j}$.

Figure 5:
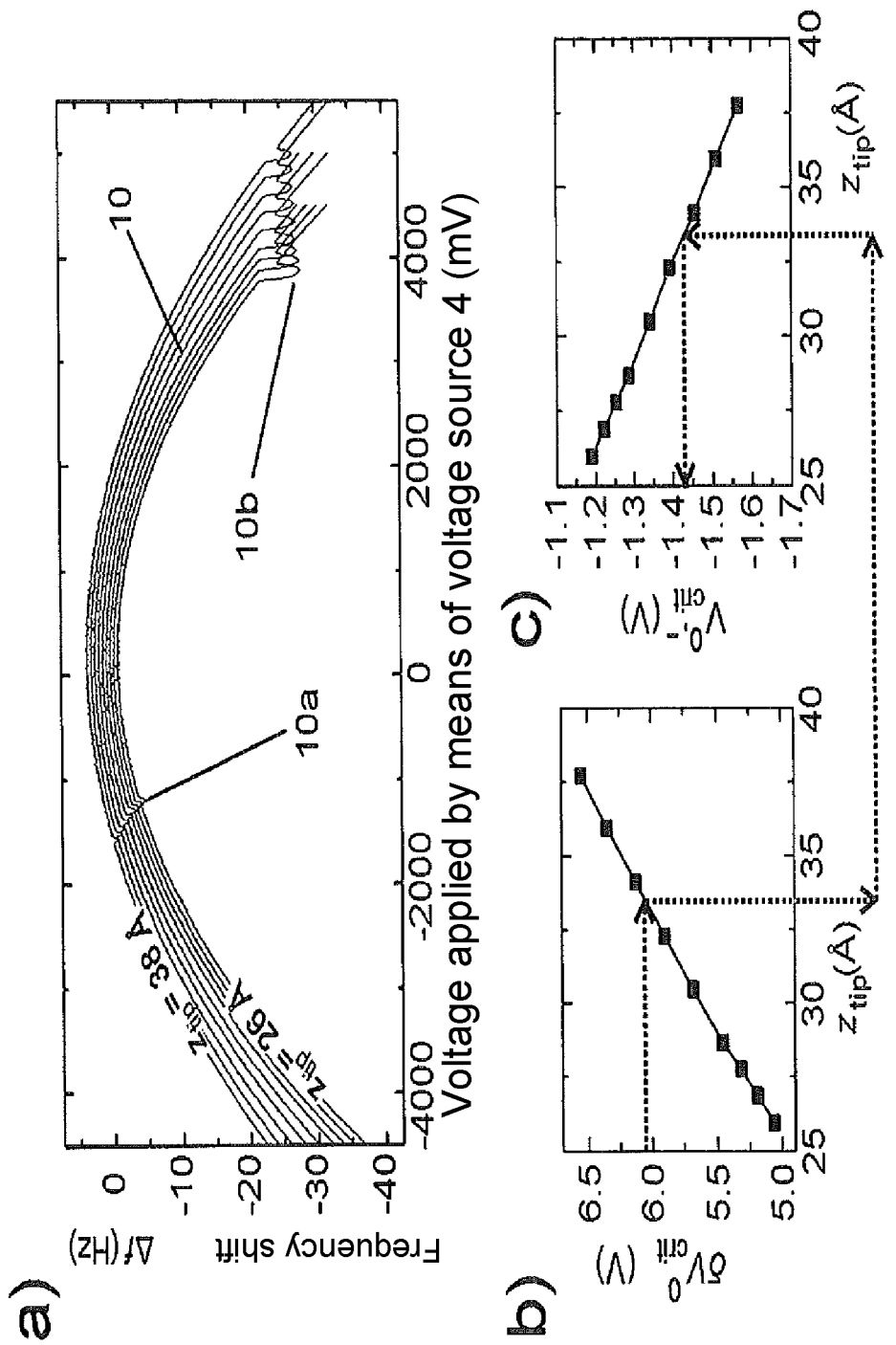
FIGS. 5$a$-5$c$ show measurement curves for an applied electrical voltage that causes the charge of the quantum dot to change (either acceptance or discharge of an electron)

If a particular nanostructure 8 has a topography deviating from the sample surface 3 and generates a local electrical potential field to be measured, the two portions, i.e. topography and electrical potential field of the nanostructure 8, can be separated from one another by means of comparison with the reference measurement in the absence of the local electrical potential field to be measured, i.e. from $V_{crit}^{0,i}$ and $V_{crit}^{0,j}$ as a function of z. This will be demonstrated below for the case where one of the charge changes of the quantum dot 2 takes place at negative critical voltages $V_{crit}^{-}$ and another takes place at positive critical voltages $V_{crit}^{+}$, as shown in FIG. 5, though this should not be taken as limiting.

To separate the topography and the electrical potential field, the values $V_{crit}^{0,+}$ and $V_{crit}^{0,-}$ are first determined as a function of the distance between the tip 1 and the sample surface 3 at a reference site A on the sample surface 3 at which the electrical potential to be measured is zero and the topography corresponds to the topography of the pure sample surface without nanostructure 8. In FIG. 5a, an atomic-force microscope was used to determine $V_{crit}^{0,+}$ (peaks 10b) and $V_{crit}^{0,-}$ (peaks 10a), though this is not limiting.

Next, $V_{crit}^{0,+}$, $V_{crit}^{0,-}$ and $\delta V_{crit}^{0}=V_{crit}^{0,+}-V_{crit}^{0,-}$ are plotted against the distance between the tip 1 and the sample surface 3. This is shown by way of example in FIGS. 5b and 5c for $V_{crit}^{0,-}$ and $\delta V_{crit}^{0}$. In FIG. 5a, 5b and 5c, the distance between the tip 1 and the sample surface 3 is denoted by $z_{tip}$. According to FIGS. 5a and 5b, the difference $\delta V_{crit}^{0}=V_{crit}^{0,+}-V_{crit}^{0,-}$ changes evenly with the distance between the tip 1 and the sample surface 3.

Now, a fixed distance $z_{tip}=a$ is selected between the tip 1 and the surface 3. The tip 1 having the quantum dot 2 is then moved to a site B over the nanostructure 8 at which the electrical potential field to be measured is located, at a constant distance a from the sample surface 3. The topography of the nanostructure 8 leads to a change in the effective distance between the tip 1 and the surface, since now the surface of the nanostructure 8 represents the actual surface rather than the sample surface 3.

At point B over the nanostructure 8, $V_{crit}^{+}$, $V_{crit}^{-}$ and $\delta V_{crit}=V_{crit}^{+}-V_{crit}^{-}$ are determined. From the difference $\delta V_{crit}=V_{crit}^{+}-V_{crit}^{-}$, the distance between the tip 1 and the nanostructure 8 can be determined using the calibration curve FIG. 5b recorded for $\delta V_{crit}^{0}$. This is indicated in FIG. 5b by dashed arrows: using the calibration curve, the value of $z_{tip}$ (denoted as b) belonging to the value of $\delta V_{crit}$ is sought. The topography signal of the nanostructure 8 can thus be determined as a–b.

Next, the electrical potential field is determined from the change in the critical voltage $V_{crit}$ according to the method described in (P6), the calibration curve FIG. 5c recorded at site A (or its equivalent for $V_{crit}^{0,+}$) being used to determine the reference value $V_{crit}^{0,-}$ (or its equivalent $V_{crit}^{0,+}$) for the distance $z_{tip}=b$. This is indicated in FIG. 5c by dashed arrows: using the calibration curve, the value of $V_{crit}^{0,-}$ belonging to the value of $z_{tip}=b$ is sought. This value is then used as the new reference value to determine $\Delta V_{crit}^{-}$ by basing the actual value $V_{crit}^{-}$ measured at site B on the $V_{crit}^{0,-}$ determined by means of the calibration curve: $\Delta V_{crit}^{-}=V_{crit}^{-}-V_{crit}^{0,-}$. From this $\Delta V_{crit}^{-}$, the local electrical potential at point B is then determined according to (P6).

(F8) Since a device according to the invention and a method according to the invention allow for the measurement of the local electrical potential field of an elementary charge e (e=1.603 $10^{-19}$ C) up to a distance of 1 μm (corresponding to a sensitivity of 1 mV in the detection of $\Delta V_{crit}$), a device according to the invention and a method according to the invention can be used to contactlessly read electrical memory elements in which a single bit of information is stored by one or more elementary charges e in a nanostructure measuring approximately one angstrom. Because of their high lateral resolution (0.5 nm), a device according to the invention and a method according to the invention can also be used to contactlessly read arrangements of memory cells if the individual memory elements are spaced 0.5 nm away from one another. Furthermore, since the local electrical potential field is measured without current, it is possible to rule out an undesirable writing process based on an electric current being used alongside the information memory reading process by means of the device according to the invention and method according to the invention.

In the following, methods that should not be taken as limiting will be described. The combined system of the quantum dot 2 and the tip 1 of the scanning probe microscope is referred to in the following as the 'quantum dot sensor'. Three example methods for the local or imaging measurement of electrical potential fields by means of the quantum dot sensor will be set out. In the process, it is assumed that an atomic-force microscope is used to determine the charge change of the quantum dot (acceptance or discharge of an electron). Neither this list of methods nor the use of an atomic-force microscope as a special implementation of a scanning probe microscope should be taken as limiting. All the methods have some steps in common, which are explained first.

When carrying out a method according to the invention, the atomic-force microscope tip 1 to which the quantum dot 2 is applied is guided over a sample surface 3 to be investigated. In the process, the positions at which the electrical potential field is to be measured are approached one after the other. These positions can differ from one another on account of both their lateral and vertical coordinates in relation to the sample surface, since the method does not require any direct contact with the sample surface 3 and allows three-dimensional maps of the electrical potential field to be measured.

At a reference position at which there is no electrical potential field to be measured, a critical voltage $V_{crit}^{0}$ that causes a charge change of the quantum dot 2 (acceptance or discharge of an electron) is determined. If charge changes of the quantum dot 2 occur for a whole series of positive and negative critical voltages $V_{crit}^{0}$, it is sufficient to determine two critical voltages that behave differently according to the distance between the tip 1 and the sample surface 3. These can be a positive critical voltage $V_{crit}^{0,+}$ and a negative critical voltage $V_{crit}^{0,-}$, though this is not limiting.

To determine the critical voltages $V_{crit}^{0}$, the voltage applied by means of the voltage source 4 is varied and the atomic-force microscope is used in its standard operating mode to detect the sudden change in force on the quantum dot sensor, which occurs as a result of the charge change of the quantum dot 2 at the critical voltages $V_{crit}^{0}$. In a particularly advantageous embodiment, this is carried out by detection in the amplitude-modulated dynamic mode of the atomic-force microscope, which, together with the frequency shift of the force sensor of the atomic-force microscope, provides a signal that is proportional to the force gradient and thus very sensitive to sudden force changes. In this respect, the sudden force change resulting from the charge change leads to a particularly strong signal.

Other possible measured variables for detecting the charge change of the quantum dot 2 are, firstly, changes to the cantilever deflection in the static mode of the atomic-force microscope and, secondly, changes to the energy dissipation in the dynamic mode of the atomic-force microscope.

The critical voltages $V_{crit}$, applied by means of the voltage source 4, at all other desired positions of the quantum dot sensor over the sample surface 3 and over a nanostructure 8 can be determined using the following methods.

(M1) Spectroscopic Method

In this method, the above-described method is repeated at each additional point. A three-dimensional map of the critical voltages $V_{crit}$ is thus obtained, from which voltages the electrical potential field can be determined from the methods described in (P6) and (F7).

(M2) Method with Direct Imaging

In this method, use is made of the finite width (referred to below as 'peak width') of the voltage range around $V_{crit}$ in which the charge of the quantum dot 2 changes. For this purpose, the applied voltage is set to a fixed value close to the critical voltage $V_{crit}$ at which the charge of the quantum dot 2 changes, and the standard operating mode of an atomic-force microscope is used for forming the image whilst the half-space region being investigated over the sample is scanned. In a particularly advantageous embodiment, the voltage value for which the change in the atomic-force microscope signal is greatest at the applied voltage is set. If the change in the critical voltage $V_{crit}$ does not exceed half the peak width and there is thus a clear relationship between the atomic-force microscope signal and the critical voltage $V_{crit}$, the atomic-force microscope signal can be directly interpreted as a variation of the critical voltage $V_{crit}$ and calibrated according to the methods in (P6) and (F7). If the change in the critical voltage $V_{crit}$ exceeds the peak width, the lines in a two-dimensional image along which the change in the atomic-force microscope signal is greatest can be interpreted as lines of constant electrical potential, i.e. as equipotential lines of the electrical potential field. FIGS. 10c and 10d show two two-dimensional images taken according to this method, showing the equipotential lines at two different values of the electrical potential. Likewise, if the set voltage is adjusted according to the change in $V_{crit}$ in relation to the distance between the tip 1 and the sample surface 3, surfaces on which the change in the atomic-force microscope signal is greatest can be interpreted in a three-dimensional image as surfaces of constant electrical potential, i.e. as equipotential surfaces of the electrical potential field.

(M3) Control Loop Method

In this method, a control loop is used to continuously maintain the applied voltage, as a manipulated variable, at the critical value $V_{crit}$ at which the charge of the quantum dot 2 changes, while the half-space above the sample surface is being scanned. An example control variable (which should not be taken as limiting) is the derivative of the frequency shift of the force sensor of the atomic-force microscope according to the applied voltage. This can, for example, be measured by means of a lock-in amplifier. The aim of the control is to continuously maintain the control variable at zero. In the region of the peak width, the control variable varies greatly according to the manipulated variable, allowing for effective control. In a particularly advantageous embodiment, this is carried out for at least two different voltages, applied by means of the voltage source 4, at which charge changes of the quantum dot are observed, the critical voltages $V_{crit}^{0,i}$ of which changes are dependent on the distance between the tip 1 and the sample surface 3 to different extents. This provides three-dimensional maps of the critical voltages $V_{crit}^{i}$ that can be used to determine the electrical potential field according to the methods in (P6) and (F7).

In a specific embodiment, the quantum dot 2 is a PTCDA molecule held by an Ag(111) surface by means of the tip 1 of an atomic-force microscope (FIG. 4a). Tunneling-spectroscopy experiments have shown that the electronic coupling function of the bond of the molecule to the tip via the terminal oxygen atom is weak, and so the sharp molecule levels only widen to an insignificant extent (width approximately 10 meV); this is a particularly advantageous embodiment. In the specific embodiment, the force is detected by a QPlus-type dynamic force sensor. In this force sensor, the frequency shift is proportional to the active force gradient. During the charge change of the quantum dot 2, during which there is a jump in the force between the tip 1 and the sample surface 3, there is therefore a sharp peak in the frequency shift signal (FIG. 5a). For sufficiently small oscillation amplitudes of the QPlus sensor, the width of this peak is directly related to the sharpness of the quantum dot level. In the specific embodiment, the QPlus sensor having the tip 1 and quantum dot 2 was scanned over an Ag(111) sample surface 3 on which there was another PTCDA molecule in the form of a nanostructure 8. Owing to the different electron negativity of the chemical elements in this molecule, this molecule has an electrical quadrupole moment. The distribution of the local electrical potential field based on this quadrupole moment was imaged using the QPlus sensor having the tip 1 and the quantum dot 2 (FIG. 4b-4m) by combining the spectroscopic method (M1) with method (P6) and (F7). An Ag adatom was also imaged on the Ag(111) surface using the same method as with the PTCDA molecule (FIG. 9a-9c) in order to calibrate the measured local electrical field of the PTCDA molecule. Finally, equipotential lines over PTCDA islands on Ag(111) were imaged using the method (M2) (FIGS. 10c and 10d).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A scanning probe microscope comprising:
a tip,
a quantum dot applied to the tip, and
wherein a tunneling barrier is located between the quantum dot and the tip,
wherein the tip is configured to guide the quantum dot to a site at which a local electrical potential field is measured,
wherein the scanning probe microscope is configured to measure a critical voltage at which a charge of the quantum dot changes;
wherein the scanning probe microscope is configured to adjust an applied voltage to a fixed value close to the critical voltage at which the charge of the quantum dot changes, and the standard operating mode of an atomic-force microscope is used to produce an image while a half-space region to be investigated above the sample is scanned, and
wherein the scanning probe microscope is configured to adjust a set voltage together with a distance between the tip and the sample surface according to a change in the critical voltage, and to interpret surfaces in a three-dimensional image, along which a change in the atomic-force microscope signal is greatest, as surfaces of constant electrical potential.

2. The scanning probe microscope according to claim 1, wherein the quantum dot is a substance.

3. The scanning probe microscope according to claim 2, wherein the substance is an organic, metal-organic, or inorganic substance.

4. The scanning probe microscope according to claim 2, wherein the substance is a molecule or a spatially restricted arrangement of material.

5. The scanning probe microscope according to claim 4, wherein the spatially restricted arrangement of material is ordered on an atomic or molecular level, or is not ordered.

6. The scanning probe microscope according to claim 4, wherein the spatially restricted arrangement of material is a nanocrystal, an ordered or non-ordered cluster, a nanotube, a carbon nanotube, or a lithographic structure.

7. The scanning probe microscope according to claim 6, wherein the nanocrystal is a metal cluster, a metal cluster having shells made of organic ligands, a doped or undoped semiconductor nanostructure, a nanowire, or a nanocrystal or cluster made of molecules.

8. The scanning probe microscope according to claim 4, wherein the molecule is an organic, bio-organic, inorganic, or metal-organic molecule.

9. The scanning probe microscope according to claim 8, wherein the molecule is a metal complex, a metallocene, an aromatic molecule, a condensed aromatic molecule, or an aliphatic molecule, or a derivative thereof, with or without a heteroatom.

10. The scanning probe microscope according to claim 1, wherein the quantum dot is a device.

11. The scanning probe microscope according to claim 10, wherein the device includes micro-scale or nano-scale electrodes and a material.

12. The scanning probe microscope according to claim 11, wherein the material is a doped semiconductor, graphene, silicon, or a two-dimensional material.

13. The scanning probe microscope according to claim 10, wherein the device is a lithographically structured material.

14. The scanning probe microscope according to claim 13, wherein the device is integrated in the tip of the scanning probe microscope.

15. The scanning probe microscope according to claim 1, wherein the tunneling barrier includes an electrically insulating layer or a chemical bond through which electrodes can tunnel.

16. The scanning probe microscope according to claim 1, wherein the scanning probe microscope is an atomic-force microscope.

17. A method for measuring a local electrical potential field, the method comprising:
guiding a quantum dot by a tip to which it is applied to a site at which the local electrical potential field is measured, and
measuring a critical voltage at which a charge of the quantum dot changes;
wherein an applied voltage is adjusted to a fixed value close to the critical voltage at which the charge of the quantum dot changes, and a standard operating mode of an atomic-force microscope is used to produce an image while a half-space region to be investigated above a sample is scanned, and
wherein a set voltage is adjusted together with a distance between the tip and a sample surface according to a change in the critical voltage, and in that surfaces in a three-dimensional image, along which a change in the atomic-force microscope signal is greatest, are interpreted as surfaces of constant electrical potential.

18. The method according to claim 17, wherein a tunneling barrier is located between the quantum dot and the tip.

19. The method according to claim 17, wherein the quantum dot is guided, by the tip to which it is applied, to a reference site at which there is no local electrical potential field to be measured, and the critical voltage at which the charge of the quantum dot changes is measured, and in that, by comparing the critical voltages at the reference site and at the site at which the local electrical potential field is measured, the local electrical potential field at said site is measured.

20. The method according to claim 17, wherein the local electrical potential field is measured quantitatively by way of the shielding factor, the gating efficiency, and the sensitivity factor.

21. The method according to claim 17, wherein the measured local electrical potential field is calibrated by way of a known electrical potential field in a reference structure.

22. The method according to claim 17, wherein an electrical memory element is read.

23. The method according to claim 17, wherein the local electrical potential field is measured without contact.

24. The method according to claim 17, wherein the local electrical potential field is measured above an insulating sample.

25. The method according to claim 17, wherein the charge change in the quantum dot is determined by way of a force change that is measured by measuring the frequency shift in the amplitude-modulated dynamic mode of an atomic-force microscope, by changing the cantilever deflection in the static mode of an atomic-force microscope, or by measuring the energy dissipation in the amplitude-modulated dynamic mode of an atomic-force microscope.

26. The method according to claim 17, wherein two different charge changes in the quantum dot, the critical voltages of which are dependent on the distance between the tip and the sample surface to different extents, are measured in order to separate the topography signal from the electrical potential field signal.

27. The method according to claim 17, wherein a two-dimensional or three-dimensional image of the local electrical potential field is taken by repeating the measurement at various points in the half-space above the sample surface.

28. The method according to claim 17, wherein the applied voltage is adjusted to a fixed value close to the critical voltage at which the charge of the quantum dot changes, and the standard operating mode of an atomic-force microscope is used to produce an image while the half-space region to be investigated above the sample is scanned.

29. The method according to claim 17, wherein there is a clear relationship between the atomic-force microscope signal and the critical voltage, and the atomic-force microscope signal is interpreted directly as a variation of the critical voltage.

30. The method according to claim 17, wherein lines in a two-dimensional image, along which the change in the atomic-force microscope signal is greatest, are interpreted as lines of constant electrical potential.

31. The method according to claim 17, wherein the applied voltage, as a manipulated variable, is held continuously at the critical value at which the charge of the quantum dot changes, while the half-space above the sample surface is scanned.

32. A scanning probe microscope comprising:
a tip,
wherein a quantum dot is applied to the tip, and
wherein a tunneling barrier is located between the quantum dot and the tip,
wherein the quantum dot is a molecule, and
wherein the molecule is 3,4,9,10-perylenetetracarboxylic dianhydride.

* * * * *